(12) United States Patent
Keraudy et al.

(10) Patent No.: US 12,306,968 B2
(45) Date of Patent: May 20, 2025

(54) PROCESS FOR DETERMINING A DEGREE OF DATA EXPOSURE

(71) Applicant: CYBELANGEL, Paris (FR)

(72) Inventors: Stevan Keraudy, Paris (FR); Paul Petit, Paris (FR)

(73) Assignee: CYBELANGEL, Paris (FR)

( * ) Notice: Subject to any disclaimer, the term of this patent is extended or adjusted under 35 U.S.C. 154(b) by 428 days.

(21) Appl. No.: 17/862,847

(22) Filed: Jul. 12, 2022

(65) Prior Publication Data

US 2023/0039039 A1 Feb. 9, 2023

(30) Foreign Application Priority Data

Jul. 16, 2021 (FR) ...................................... 2107731

(51) Int. Cl.
 *G06F 21/60* (2013.01)
(52) U.S. Cl.
 CPC .................................. *G06F 21/606* (2013.01)
(58) Field of Classification Search
 CPC ..................................................... G06F 21/606
 USPC ........................................................... 726/26
 See application file for complete search history.

(56) References Cited

U.S. PATENT DOCUMENTS

| | | | | |
|---|---|---|---|---|
| 7,207,065 B2 * | 4/2007 | Chess | ................. | G06F 11/3612 726/25 |
| 8,078,617 B1 * | 12/2011 | Neveitt | ................. | G06F 16/335 707/732 |
| 9,916,309 B2 * | 3/2018 | Mani | ...................... | G06N 20/00 |
| 10,339,147 B1 * | 7/2019 | Barmes | ................... | G06N 5/046 |
| 11,436,205 B2 * | 9/2022 | Patil | ........................ | G06F 17/18 |
| 11,579,919 B2 * | 2/2023 | Baset | .................... | H04L 63/123 |
| 11,631,021 B1 * | 4/2023 | Benjamin | .............. | G06Q 50/18 704/1 |
| 11,809,458 B2 * | 11/2023 | Pascarella | ........... | G06F 16/2228 |
| 11,809,896 B2 * | 11/2023 | Baset | .................... | H04L 9/0637 |
| 11,997,493 B2 * | 5/2024 | Muthuswamy | ......... | G06F 18/20 |
| 2004/0215606 A1 * | 10/2004 | Cossock | .............. | G06F 16/951 |
| 2017/0154288 A1 * | 6/2017 | Barnum | ............. | G06Q 10/0637 |

(Continued)

FOREIGN PATENT DOCUMENTS

CN 104992113 A 10/2015

OTHER PUBLICATIONS

Preliminary Research Report issued on Mar. 9, 2022, in corresponding French Application No. FR2107731; 9 pages.

*Primary Examiner* — Dant B Shaifer Harriman
(74) *Attorney, Agent, or Firm* — Maier & Maier, PLLC (57) ABSTRACT

A process for determining a degree of data exposure based on receiving entries associated with documents, where each of these entries includes an access path and information about a server hosting the documents. The process may include generating subsets from the set of entries, and, for at least one of the subsets, determining at least one of a first and a second score. The first score may be determined by generating a value as a function of the access paths, and using a machine-learning algorithm to determine the first score based on this value. The second score may be determined by receiving content associated with each entry, generating a value as a function of the associated content, and determining, with a machine-learning algorithm, the second score based on the value. A degree of exposure of the data present on the associated server may be determined from one or both scores.

15 Claims, 6 Drawing Sheets

(56) References Cited

U.S. PATENT DOCUMENTS

| | | | |
|---|---|---|---|
| 2017/0293917 A1* | 10/2017 | Dhurandhar | G06Q 30/04 |
| 2018/0143958 A1 | 5/2018 | Kakkad et al. | |
| 2018/0285685 A1* | 10/2018 | Singh | G06F 16/9038 |
| 2019/0163919 A1* | 5/2019 | Holz | G06F 16/338 |
| 2020/0004989 A1 | 1/2020 | Lockhart, III et al. | |
| 2021/0133648 A1* | 5/2021 | Bennett | G06F 21/6245 |
| 2021/0258400 A1* | 8/2021 | Therani | H04L 67/5682 |
| 2022/0122721 A1* | 4/2022 | Alberico | G16H 50/20 |
| 2022/0261688 A1* | 8/2022 | Nimavat | G06F 18/2113 |
| 2022/0366078 A1* | 11/2022 | Kirti | G06N 5/022 |
| 2024/0428127 A1* | 12/2024 | Kartoun | G06N 20/00 |
| 2025/0047683 A1* | 2/2025 | Joshi | G06N 20/00 |

\* cited by examiner

PROCESS FOR DETERMINING A DEGREE OF DATA EXPOSURE

FIELD OF DISCLOSURE

The present disclosure relates to the field of automated detection of data leaks.

BACKGROUND

For companies, guaranteeing the protection of their confidential data represents a major issue, in particular economic and strategic. Nevertheless, data leaks, also called data breaches, can exist.

The data leak can be defined as a computer security incident leading to exposure of data outside of the scope for which the data are intended.

Data leaks may target companies, administrations or even individuals and are mainly distributed in three major categories: cyberattacks, human error (internal or external) and errors due to the systems containing the data.

A cyberattack is a malevolent act threatening computer systems for the purpose of inappropriately and/or illegally using data obtained during the cyberattack.

Human error occurs accidentally and may be due to the negligence of an individual with access to the data which leaked.

A system error may, for example, be the result of a configuration defect in devices from the computer technology domain or even a failure in the internal/external processes specific to a company.

The consequences of a data leak may be variable and dependent in particular on the level of sensitivity of the data, the nature of the data leak and measures established for anticipating and correcting potential data leaks.

In France, in 2020, the average cost of a data leak for a company was estimated at €4.01 million as reported by the study 2020 Cost of a Data Breach prepared by the Ponemon Institute and IBM Security. This study also reports that on average a data leak in France is identified by the compromised company after 205 days.

Thus, it is very important for the company to avoid such data leaks and if they occur, it is crucial to be able to detect them without delay in order to be able to remedy them. Further, these data can be located almost anywhere and it is complex for company to monitor all the data accessible online, or more generally over all of the open data sources in order to monitor these leaks.

Faced with this difficulty, many companies only act in reaction.

Additionally, if data leaks are sought conventionally, for example by looking for keywords in billions of results on the Internet, this search may require significant calculating power and imposing data centers or server farms. Thus, electric consumption and economic cost of such a search may be prohibitive.

The present invention aims to improve the situation by proposing a proactive monitoring for data leaks minimizing the complexity of the search and thus reducing the energy consumption this search requires.

SUMMARY OF DISCLOSURE

For that purpose, the present description proposes a process for automated detection of data leaks, where as previously indicated, a data leak may be defined as a computer security incident allowing exposure of data outside the scope for which the data are intended.

A "data exposure" may for example be making data freely accessible on an open server.

A "degree of data exposure" may be defined as a measure, quantitative or qualitative of the exposure of the data. That way, a degree of data exposure may be correlated to a pertinence of the computer security incident giving rise to the exposure of the data. Determining the degree of exposure of the data may then serve to determine whether the exposed data could represent a computer security threat without the use of the data necessarily having been observed. Proactive monitoring of the data may thus be made possible.

The aim of the present description is therefore, in a first embodiment, a process for determining the degree of data exposure, wherein the process may comprise the steps of:

receiving a set of entries associated with documents, where each of the entries may comprise a respective access path for the associated document and information about the server hosting said associated documents;

generating subsets from the set of entries on the basis of information about the server;

for at least one subset in said generated subsets:
determining at least one score among a first and a second scores;

wherein determining the first score may comprise the steps of:

generating a value for a first characteristic of said at least one subset, where said value of the first characteristic may be a function of the access paths included in each entry from said subset;

determining, with a machine-learning algorithm, the first score based on said value of the first characteristic;

and wherein determining the second score may comprise the steps of:

receiving content associated with each entry from said subset;

generating a value of a second characteristic for said at least one subset, where said value of the second characteristic may be a function of said associated content;

determining, with a machine-learning algorithm, the second score based on said value of the second characteristic;

determining, on the basis of the at least one score, the degree of exposure of the data present on said server associated with said subset.

In that way, for one subset, determining the degree of exposure of the data present on the server associated with a subset, may be done as a function of a value of a first characteristic and/or of a value of a second characteristic.

A "characteristic" may be defined as a variable taking a specific value as a function of an observation.

The value of the first characteristic may be generated as a function of the access paths included in each entry from the subset, meaning as a function of character strings which can describe the position in the server of the documents associated with the entries.

The value of the second characteristic may be generated as a function of the contents associated with the entries from the subset which can be the contents of the documents associated with the entries. The contents may be binary or other.

In that way, the value of the first characteristic and/or the value of the second characteristic may be generated from the access paths and the contents, which may be commonly accessible and processed, as will be described later in the remainder of the description, which may allow an efficient implementation of the process with in particular low energy costs.

"Server" is understood to mean one or more physical or virtual computers providing at least one IT service (e.g. cloud storage service, FTP storage, etc.). This term targets any virtualized server whatever the virtualization technology used.

In the meaning of the present description, the process may then provide a possibility of scaling up determining the degree of data exposure, meaning a possibility of maximizing a number of subsets for which a degree of data exposure is determined. Scaling up determining the degree of data exposure may thus allow quickly detecting data leaks which could represent a security threat, because a large number of subsets may be analyzed simultaneously.

Further, the process according to the present description proposes determining the degree of exposure of the data present on said server associated with said subset, which makes it possible to identify the server containing the exposed data. The identification of the server containing the exposed data may thus allow formulating one or more centralized actions at the server level in order to limit the consequences of the exposure of the data instead of having to formulate one or more independent actions for plurality of documents from the server. Advantageously the consequences of the data exposure may be limited, in particular about a loss of confidentiality of the data and the previously mentioned energy and economic impacts.

Further, the value of the first characteristic may be a function of a number of distinct access paths in the entries from the subset or occurrences of preset first keywords in access paths for each entry from said subset.

The first keywords may for example be keywords that are specific or not to a third party as will be shown in the remainder of the description.

The number of distinct access paths in the entries from the subset and/or the occurrences of preset first keywords in the access paths of each entry from said subset may be parameters having a significant impact on determining the first score as emphasized in the remainder of the description.

Determining the value of the first characteristic as a function of these parameter(s) may then serve to get a value of the first score significantly correlated to a degree of real exposure of the data present on said server associated with said subset. Performance of the process may then be improved, in particular by increasing the number of servers correctly identified as containing data which could represent a security threat.

In an embodiment of the description, the value of the second characteristic may be a function of occurrences of second preset keywords in the contents associated with each entry from said subset.

The second keywords may for example be keywords that are specific or not to a third party as will be shown in the remainder of the description. The second keywords may or may not include the first keywords.

The occurrences of preset second keywords may have a major significance for determining the second score, as will be shown in the remainder of the description.

Determining the value of the second characteristic as a function of the occurrences of preset second keywords may then serve to get a value of the second score significantly correlated to a degree of real exposure of the data present on said server associated with said subset. Performance of the process may then be improved, in particular by increasing the number of servers correctly identified as containing data which could represent a security threat.

Further, receiving the contents may be dependent on a portion of entries, where the portion of entries may be determined on the basis of occurrences of preset keywords in the access paths of the entries from the subset.

The preset keywords may comprise preset first keywords and/or preset second keywords and/or other preset keywords which may for example include file extensions.

Making receiving contents conditional on a portion of the entries may serve to reduce the number of contents received/downloaded, which may in particular serve to reduce the energy consumption required for calculating the value of the second characteristic and subsequently of the second score and the degree of exposure of the data.

In a second alternative embodiment, a process for determining a degree of exposure of data is proposed, wherein the process may comprise:
receiving a set of entries associated with documents, where each of the entries may comprise a respective access path for the associated document and information about the server hosting said associated documents;
for at least one entry in said received set of entries:
determining at least one score among a first and a second score, wherein determining the first score may comprise the steps of:
generating a value for first characteristic for said at least one entry, where said value of the first characteristic may be a function of the access path included in said at least one entry;
determining, with a machine-learning algorithm, the first score based on said value of the first characteristic;
and wherein determining the second score may comprise the steps of:
receiving at least one content associated with said at least one entry;
generating a value of a second characteristic for said at least one entry, where said value of the second characteristic may be a function of said at least one associated content;
determining, with a machine-learning algorithm, the second score based on said value of the second characteristic;
generating subsets from the set of entries on the basis of information relating to the server;
for at least one subset in said generated subsets:
determining, on the basis of the at least one score determined for each entry from said subset, the degree of exposure of the data present on said server associated with said subset.

The second embodiment is an alternative to the first embodiment presented earlier. In the second embodiment, the subset generation step is exchanged with the step of determination of at least one score, compared to the first embodiment.

As before, the value of the first characteristic and/or the value of the second characteristic may be generated from the access paths and the contents, which may be commonly accessible and processed, which may allow an efficient implementation of the process with in particular low energy costs. Scaling up determining the degree of exposure of the data may also be made possible, which can allow quickly detecting data leaks which could represent a security threat. Further, the identification of the server containing the exposed data may also be possible, limiting the consequences of the data exposure.

Additionally, the value of the first characteristic may be a function of occurrences of preset first keywords in the access path of said at least one entry, which could serve to get a value of the first score significantly correlated with a real exposure degree for the data present on said server associated with said subset and improving performance of the process.

The value of the second characteristic may be a function of the occurrences of preset second keywords in the at least one content associated with said at least one entry, which may serve to get a value of the second score significantly correlated to a degree of real exposure of the data present on said server associated with said subset and improving performance of the process.

In a specific mode of the description, the first and second scores may be determined and the degree of exposure of the data present on said server associated with said subset may be determined on the basis of the first and the second scores. This particular mode may be applied to all the previously described processes.

The first and second scores may be determined successively or simultaneously. In the case where the first and second scores are determined successively, the steps of determination of scores may be permuted, meaning the first and then the second score may be determined or vice versa.

Determining the first and second scores may thus allow correlation of the information contained in each of the first and second scores. The pertinence of the determined degree of exposure of the data may in that way be increased.

Further, the information about the server may comprise at least one item of information among an IP address of the server, a URL of the server, a domain name of the server, a port used by the server and a protocol used by the server; this could allow effectively generating the subsets from the set of entries and increasing the efficiency of determining the degree of exposure of the data present on the server associated with the subset.

A device intended for determining the degree of data exposure may be advantageous, in itself.

Thus, the present invention also targets devices intended to implement all or part of the previously described processes.

A computer program, implementing all or part of the processes described above, installed on pre-existing equipment, is in itself advantageous, since it allows determining a degree of data exposure.

In that way the present invention also targets a computer program comprising instructions for implementation of the previously described processes when this program is executed by a processor.

This program may use any programming language (for example, an object-oriented language or other), and be in the form of an interpreted source code, a partially compiled source code, or a totally compiled code.

According to an aspect, a computer-readable nonvolatile storage medium is also proposed on which such a program is recorded.

BRIEF DESCRIPTION OF THE DRAWINGS

Other characteristics, details and advantages will appear upon reading the following detailed description, and analyzing the attached drawings, on which.

DETAILED DESCRIPTION OF THE EMBODIMENTS

Figure 1:
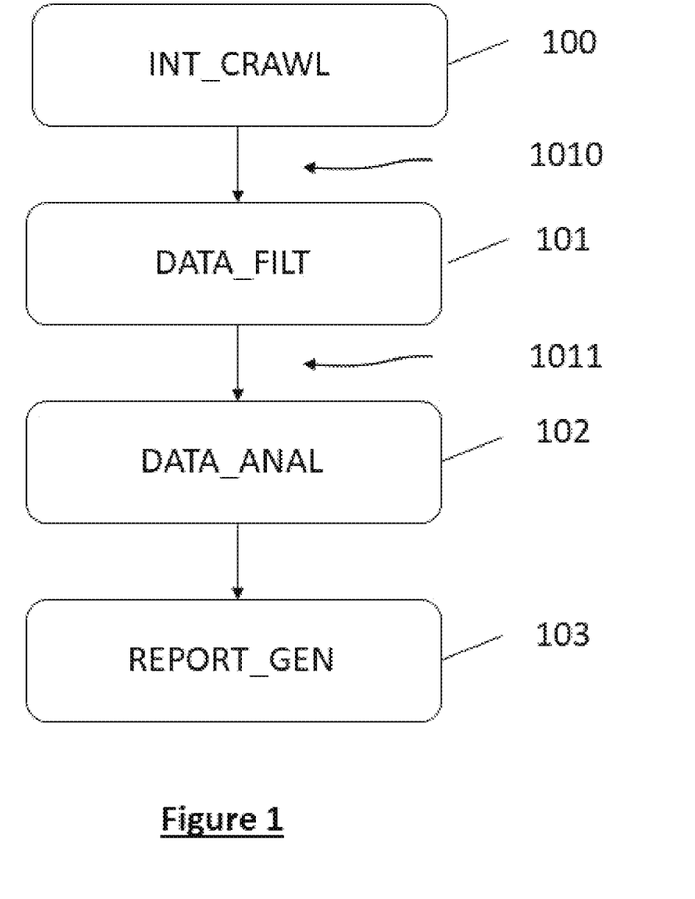
FIG. 1 represents a flowchart of various steps of a sample process for determination of a degree of data exposure in the meaning of the present invention.

Now refer to FIG. 1.

FIG. 1 shows different steps which may be implemented during a process for determining the degree of data exposure. This process may aim to generate a specific report for a given third party/entity when leaked data specific to this third party/entity are found freely accessible on the Internet. In other words, it may involve crawling/monitoring billions of data items accessible on the Internet (whether that is via an HTTP/HTTPS or other protocol) in order to find leaked data specific to a given third party/entity, and then reporting only a limited number of alerts relating to the leaked data.

According to an embodiment, the process for detection of a degree of data exposure may comprise four main steps: INT_CRAWL 100, DATA_FILT 101, DATA_ANAL 102, and REPORT_GEN 103, describe below.

The order of the steps INT_CRAWL 100, DATA_FILT 101, DATA_ANAL 102 and REPORT_GEN 103 may be changed. Further, some steps may be performed in whole or in part in parallel (i.e. one step may start even though another step is not finalized).

In an initial step INT_CRAWL 100, an automated crawl of open servers may server to look for open ports on a server.

Conventionally these open ports may each have a port number included between 0 and 65535. These ports may be representative of services available on the servers.

It is possible to connect to these ports without authentication.

Once connected to a port, it is possible to access documents freely accessible on the port. For example, an accessible/discovered document may be an HTML, PDF or other document if the crawled port offers an HTTP, FTP or SMB type service. Of course, any type of file format can be found or any type of protocol can be used.

During this step, this crawl may make it possible to constitute a database having a plurality of entries each comprising, in particular, the IP address of the server or URL of the server or a domain name of the server, the port (previously mentioned) and also the access path of the document discovered. This path may be a URL in the case of a document discovered on an HTTP type service. This path may be an FTP or an FTP URL path in the case of a document discovered on an FTP type service.

An entry may also comprise metadata associated with the entry. The metadata may for example comprise, a creation date of the access path associated with the entry on the server, a creation date of the discovered document whose access path is associated with the entry on the server, a size of the discovered document whose access path is associated with the entry on the server, etc.

During this step, the content (binary or other) of the documents is not necessarily downloaded in order to accelerate the crawling process.

On output from the step INT_CRAWL, 100, the database thus constituted may comprise billions of entries.

The step INT_CRAWL 100 is not necessarily specific to a third party and may simply aim to list the set of access paths of the documents accessible on the crawled servers, without a priori on the data leaks sought.

In a second step DATA_FILT 101, the database entries coming from the step INT_CRAWL 100 may be filtered as will be described below.

The step DATA_FILT 101 may be specific to a given third party.

The filter from step DATA_FILT 101 may aim to generate a list of open servers which could contain leaked documents specific to a third party from the entries in the database coming from step INT_CRAWL 100.

The list of servers obtained at the output of step DATA_FILT 101 may aim to contain all the open servers which could contain leaked documents specific to a third party while also being the most reduced possible.

In other words, the filter for step DATA_FILT 101 may aim to minimize the number of false negatives, meaning the number of servers containing leaked documents specific to a third party which would be excluded from the list, all while maximizing the detection (and elimination) of false positives, meaning the detection of entries not containing leaked documents specific to a third party which would be included in the subset.

On output from the step DATA_FILT 101, the list of open servers, which could contain leaked documents specific to a third party, thus built up may comprise thousands of servers. Thus, from the billions of entries from the database, the filter from step DATA_FILT 101 may generate a list which could comprise thousands of servers. That may correspond to a reduction of the dimensionality of the information by a factor which could reach one in one million.

In the third step DATA_ANAL 102, the list of servers obtained during the step DATA_FILT 101 may be analyzed.

This analysis may be done by a human operator and is optional.

In that way the operator may consult some servers contained in the list of servers obtained during the step 101 in order to estimate whether this server effectively contains data pertinent to the objective of detection of leaks which could represent a computer security threat. This analysis by the operator therefore comprises a manual review of documents which could constitute a data leak.

On output from the analysis step DATA_ANAL 102, around a hundred alerts specific to a third party may be generated. These alerts may for example contain the IP addresses of servers identified as containing leaked documents specific to the third party and/or the geo-localization of the identified servers and/or the leaked documents and/or the identity of the holders of the leaked documents.

A fourth step REPORT_GEN 103 may consist of only generating a reduced number of reports in order to report the different alerts generated at the step DATA_ANAL 102 or DATA_FILT 101 (if, for example, the step 102 is not done). For example, a single report may be generated for a given third party.

In that way from billions of data items accessible on the Internet, the process of data leak detection may generate only one single report specific to a third party. This report may comprise around a hundred alerts specific to this third party and may target the alerts specific to one or several servers. These alerts may comprise the IP addresses of servers identified as containing leaked documents specific to the third party and/or the leaked documents and/or the identity of the holders of the leaked documents.

Figure 2:
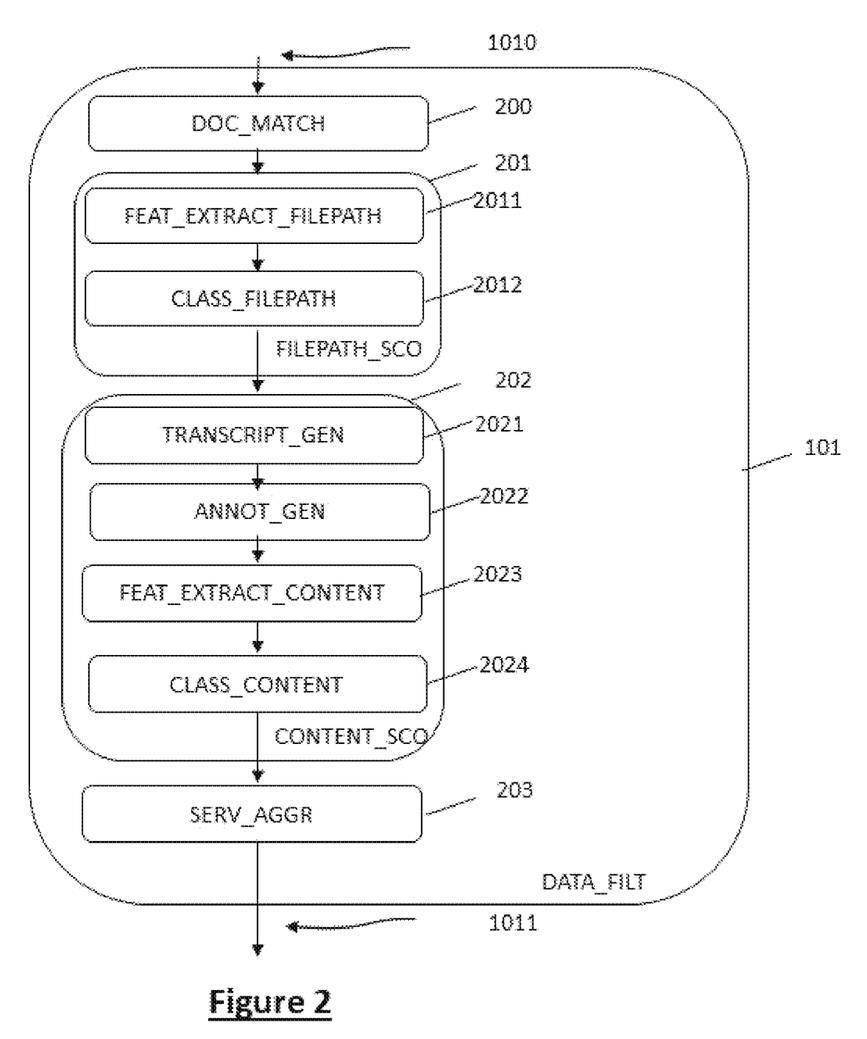
FIG. 2 represents a flowchart of various steps of the data filtering step DATA_FILT 101 according to an embodiment.

As shown in FIG. 2, the filter for the step DATA_FILT 101 may comprise steps among the four main steps, DOC_MATCH 200, FILEPATH_SCO 201, CONTENT_SCO 202 and SERV_AGGR 203, described below. In particular, it is possible to implement only one of the steps FILEPATH_SCO 201 and CONTENT_SCO 202. Alternatively, it is possible to implement the steps FILEPATH_SCO 201 and CONTENT_SCO 202, successively without definite order or simultaneously.

Further, the step DATA_FILT 101 may comprise the step of receiving 1010 a set of entries associated with documents, where each of the entries comprising a respective access path for the associated document and information about the server hosting said associated document. The set of entries may for example be the set of entries from the database coming from step INT_CRAWL 100.

The step DOC_MATCH 200 may aim to perform a first filtering of the documents discovered during the step INT_CRAWL 100. The filtering of discovered documents may be based on comparisons between the entries which are or will be stored in the database (notably the access path of the discovered document) and a list of keywords. When this filtering takes entries which are stored in the database as input, one speaks of filtering by querying. When this filtering takes entries which will be stored in the database as input, one speaks of streaming filtering.

The comparisons may be based on preset rules.

These rules may serve to construct a first comparison filter.

This first comparison filter might not be specific to a third party. This first filter is optional.

For example, this first comparison filter may consist of excluding entries not comprising keywords in the list of keywords mentioned previously or excluding the entries comprising fewer than N (integer) keywords in the previously mentioned keyword list.

Conversely, this first filter may also provide for not retaining some entries when some keywords can be found in them (for example the name of public conferences, shows, etc.).

This first optional comparison filter may allow a rapid reduction of the number of entries from the database.

These comparison rules may also allow construction of a second comparison filter giving rise to a stricter comparison.

The second comparison filter may for example comprise filters specific to different third parties.

The second optional comparison filter may, for example, consist of applying a principal similar to the first filter but with keywords specific to a third party. For example, these keywords may have been communicated by the third party to make detection of leaks specific to them easier.

These keywords may be a corporate name, the name of an internal project, the reference to a plan, the serial number of a part, etc.

Conversely, this second filter may also provide for not retaining some entries when some keywords can be found in them (for example the name of some presentations made publicly by this third party, references from commercial prospectuses, etc.).

The second comparison filter may be applied to all of the entries in the database (i.e. without filtering with the first filter). In this case, additionally, the first comparison filter may, optionally, be applied to only the database entries for which a match, or correspondence, was established during filtering with the second comparison filter.

A match may be defined when a given character string, for example a keyword, is found completely and identically in another character string.

Alternatively the second comparison filter may be applied to only the database entries for which a match was established during filtering with the first comparison filter.

On output from step DOC_MATCH 200, a label may be assigned to each of the entries from the database. This label may for example be a digital or a Boolean label. A match rule may also be associated with each of the entries from the database. This match rule may for example comprise the match(es) established during the step DOC_MATCH 200.

For example, a first label "1" may be assigned to the entries from the database for which a match was established during the step DOC_MATCH 200. A second label "0", different from the first label, may for example be assigned to the entries from the database for which no match was established during the step DOC_MATCH 200. It is possible to define that no match was established if for example, when only one of the first and second filters is implemented, the only filter has filtered the entry and found no match or if, when the first and second filters are implemented, cumulatively, the first filter and the second filter have filtered the entry and have not found a match.

The step FILEPATH_SCO 201 may aim to calculate scores from entries in the database and also from the labels obtained during the step DOC_MATCH 200. These scores may be calculated from access paths included in the entries from the database.

During the step of assigning scores FILEPATH_SCO 201, the content (binary or other) of the documents is not necessarily downloaded in order to accelerate the process of assigning scores.

According to an embodiment, the step of assigning scores FILEPATH_SCO 201 may comprise two main steps: FEAT_EXTRACT_FILEPATH 2011 and CLASS_FILEPATH 2012.

The step FEAT_EXTRACT_FILEPATH 2011 may serve to generate characteristics, or features, from entries in the database. The characteristics may for example be functions of the access paths included in the entries from the database.

For example, static characteristics and/or dynamic characteristics may be generated in the step FEAT_EXTRACT_FILEPATH 2011. The number of static characteristics may be independent of the number of observations used during establishment of the characteristics. The number of dynamic characteristics may depend on the number of observations used during establishment of the characteristics.

The dynamic characteristics may be determined from the weighting processes such as the TF-IDF method (https://fr.wikipedia.org/wiki/TF-IDF). For example, the TF-IDF method may be applied to character sequences included in the access paths. The character sequences considered may have a length included between 2 and 5 characters. The character sequences considered as underrepresented, meaning the character sequences whose frequency of appearance is less than 1%, may not be included in the character sequences taken as input to the weighting method.

Examples of static characteristics are given below.

Static characteristics may be generated from matches between a set of discriminating terms and the access paths to the documents included in the entries from the database.

The set of discriminating terms may include terms in several languages.

The set of discriminating terms may include terms from the following list of terms: accounting, admin, advertisement, affidavit, agreement, corporate, correspondence, cost, database, maintenance, management, mandate, market meeting, memorandum, minutes, mock_up, molecule, वातानुकूलन, विश्लेषण, परिशिष्ट, आडिट, बिल्ला, तुलन_पत्र, खाका, व्यापार, 分子, 非開示, 提供, 組織図.

For example, a characteristic may be a ratio between a number of occurrences of a discriminating term given in the access path and a number of entries from the database. In that way, a given discriminating term located in most of the access paths will have, according to an arbitrary convention, a ratio close to 1. A given discriminating term located in a few of the access paths will have, according to an arbitrary convention, a ratio close to 0. Of course, it is possible to adopt any other convention.

Characteristics may be generated from lengths of access paths. The length of an access path may correspond to a length in number of characters or a depth in a tree structure file system. For example, an access path length may be a number of sequences separated by a slash "I" or any other separator according to a convention existing in the IT world.

A characteristic may be generated from a number of access paths included in the entries of the database. According to an embodiment, a characteristic may be generated from a mathematical transformation of this number.

Characteristics may be generated from lengths in characters of access paths. The length in characters of an access path may be defined as the number of characters present in an access path.

Characteristics may be generated from correspondences between a keyword and an access path. The keywords may be the same keywords as those from step DOC_MATCH 200.

The characteristic may for example be a number of occurrences of keywords in the access paths.

A characteristic may be a ratio between a length in characters of all the matches between a keyword and an access path, and a total length in characters of all the access paths included in the entries from the database. The length in characters of a match between a keyword and an access path may be defined as the number of characters included in a match.

As an illustrative example only, for a path "/Server/Data/Documents/admin," the length in characters of the correspondence between the access path "/Server/Data/Documents/admin" and in the keyword "admin" would be 5. The length in characters of all matches may correspond to the sum of the lengths in characters of each of the matches obtained from the entries from the database. The total length in characters of all the access paths may correspond to the sum of the lengths in characters of each of the access paths included in the entries from the database. This characteristic may thus serve to give a representation of the presence of keywords in the access paths included in the entries from the database.

A characteristic may be a ratio between a number of special characters and the total length in characters of all the access paths.

Some characteristics may be generated from the presence or absence of extensions appearing on a white list in the access paths included in the entries from the database.

The white list may include extensions specific to text documents, like ".txt". The white list may include extensions specific to images, like ".jpeg", ".png". The characteristics generated on the basis of these document-type specific extensions made thus give a representation of the various types of documents accessible on the server.

A characteristic may be a ratio between the number of occurrences of an extension in the access paths and the total number of access paths.

Characteristics may be generated from metadata derivable from the access paths included in the entries from the database.

For example, characteristics may be generated from creation dates of the access paths. A characteristic may report the creation date of the most recent access path from the entries in the database. A characteristic may report the creation date from the oldest access path from the entries in the database. These characteristics may serve to give a different representation to the data from the database depending on the presence of recent activity or not.

The step CLASS_FILEPATH 2012 serves to assign a score based on characteristics generated from the step FEAT_EXTRACT_FILEPATH 2011.

According to an embodiment, the step CLASS_FILE-PATH 2012 may be implemented with the model built from statistical rules.

The model from step CLASS_FILEPATH 2012 may take as input characteristics among the characteristics generated in step FEAT_EXTRACT_FILEPATH 2011, taken alone or in combination.

The model from step CLASS_FILEPATH 2012 may for example be a machine-learning algorithm.

The machine-learning algorithm for the model from step CLASS_FILEPATH 2012 may be a neural network. Alternatively, the machine-learning algorithm may for example be a random forest algorithm or a gradient boosting algorithm.

The machine-learning algorithm may for example be trained periodically. For example, a training phase can take place every month.

On output from the model from step CLASS_FILEPATH 2012, a numeric score may be obtained from characteristics generated in step FEAT_EXTRACT_FILEPATH 2011. The numeric score may be included between a lower limit and an upper limit. Conventionally, the value 1 may be assigned to the lower limit. The value 100 may be assigned to the upper limit. The lower limit may be associated with an entry thought not to be pertinent. The upper limit may be associated with an entry thought to be very pertinent. Other conventions may be adopted for signing scores.

Another score may be obtained on output from step FILEPATH_SCO 201. The score obtained on output from step FILEPATH_SCO 201 may be the score obtained on output from the model from step CLASS_FILEPATH 2012 or a transformation of this score.

The step FILEPATH_SCO 201 may be associated with a preset threshold. The preset threshold may be set as a function of the desired sensitivity of the model, meaning as a function of the desired capacity of the model to detect leaked documents and identify them as leaked documents. The preset threshold may be fixed by an operator or be fixed dynamically as a function of distribution of scores among all the inputs: for example it may be fixed by keeping only x % (x included between 0 and 100) of the entries or a preset number of entries. Of course, this threshold may also be determined as a function of a combination of the entries previously indicated such as the minimum between a percentage and a preset number of entries.

Each of the scores obtained in step CLASS_FILEPATH 2012 may be compared to the preset threshold. For example, conventionally, if the score associated with an entry is greater than the preset threshold, then this entry may be deemed to be pertinent and to be analyzed in the remainder of the process for determining the degree of exposure of the data. In this case, the score on output from step FILEPATH_SCO 201 may be the same as the score on output from step CLASS_FILEPATH 2012. If a score associated with an entry is less than the preset threshold, then this entry may be deemed to not be pertinent and to no longer be analyzed in the remainder of the process for determining the degree of exposure of the data. In this case, the score on output from the step FILEPATH_SCO 201 may be a Boolean value, for example "0".

In that way, based on the set of the entries in the database obtained in step DOC_MATCH 200, the step FILEPATH_SCO 201 may serve to determine a subset of entries from the database which could contain leaked data specific to a third party.

The step CONTENT_SCO 202 may aim to calculate other scores from entries in the database and also from the labels obtained during the step DOC_MATCH 200. These scores may be calculated from the content of the documents, whose access path is among the entries from the database.

The step of assigning scores CONTENT_SCO 202 may take as input the subset of entries which could contain leaked data obtained on output from the step FILEPATH_SCO 201. Alternatively, the step of assigning scores CONTENT_SCO 202 may take as input the set of the entries from the database obtained in step DOC_MATCH 200.

According to an embodiment, the step of assigning scores CONTENT_SCO 202 may comprise steps from five main steps: TRANSCRIPT_GEN 2021, ANNOT_GEN 2022, FILE_AGGR 2025, FEAT_EXTRACT_CONTENT 2023 and CLASS_CONTENT 2024.

The order of the steps TRANSCRIPT_GEN 2021, ANNOT_GEN 2022, FILE_AGGR 2025, FEAT_EXTRACT_CONTENT 2023 and CLASS_CONTENT 2024 may be changed. Further, some steps may be performed in whole or in part in parallel (i.e. one step may start even though another step is not finalized).

For an entry from the database analyzed in step TRANSCRIPT_GEN 2021, the document to which the entry refers may be downloaded on the server corresponding to the entry. In other words, the step TRANSCRIPT_GEN 2021 may comprise receiving contents associated with the entry.

The step TRANSCRIPT_GEN 2021 may serve to generate, for an entry from the analyzed database, a transcription of the document to which the entry refers. A transcription may generate a transcribed document containing a textual version of a content of the document to which the entry refers.

For example, for a document containing only text, the step TRANSCRIPT_GEN 2021 may be optional. For a document containing only text, the transcribed document may be the document itself. For an image type document containing text, the transcribed document may be a text document containing the text from the image.

The step ANNOT_GEN 2022 may serve to generate a document of annotations from a transcribed document obtained in step TRANSCRIPT_GEN 2021. Generation of the document of annotations may serve to extract information which could be pertinent for the generation of the score assigned on output from the step CONTENT_SCO 202.

The document of annotations specific to a transcribed document may comprise matches between the content of the transcribed document and keywords specific to the third party. The document of annotations specific to a transcribed document may comprise matches between the content of the transcribed document and keywords not specific to the third party.

The document of annotations specific to a transcribed document may comprise a prediction of a category of the document to which the entry refers. A category may for example be a thematic family with which the content of the document to which the entry refers may be associated. For example, a category may be associated with the family of technical drawings. A category may be associated with the family of illustrations. A category may be associated with the family of finance-related documents. A category may be associated with the family of invoices. A category may be associated with the family of databases. A category may be associated with the family of internal organizational information of the third party. A category may be associated with the family of information and communication technologies. A category may be associated with the family of computer code. A category may be associated with the family of multimedia documents. A category may be associated with the family of personal information. A category may be associated with the family of ransoms. A category may be associated with the family of documents for which no other family seems appropriate.

The prediction of the category may be established by a model built from statistical rules. The model may for example be a machine-learning algorithm. The machine-learning algorithm may for example be a multiclass classification algorithm. The machine-learning algorithm may assign to the transcribed document a probability that the document to which the entry refers belongs to a certain category. The prediction of the category may then be the category for which the resulting probability is the largest.

The document of annotations specific to a transcribed document may comprise a prediction of the sensitive nature of the document to which the entry refers. This prediction may be established by a model built from statistical rules. The model may for example be a machine-learning algorithm. The machine-learning algorithm may for example be a classification algorithm. The machine-learning algorithm may assign to the transcribed document a probability that the document to which the entry refers contain sensitive information. A document containing information predicted to be very sensitive may have a score near 1.

The step FEAT_EXTRACT_CONTENT 2023 may serve to generate characteristics from a document of annotations generated in step ANNOT_GEN 2022. The characteristics may be a function of the content associated with a document obtained in step TRANSCRIPT_GEN 2021. For example, a characteristic may be obtained from matches between the content of the transcribed document and keywords specific to the third party or not. In particular, a value of a characteristic may be a number of matches between the content of the transcribed document and the keywords specific and/or nonspecific to the third party. A characteristic may also be obtained from a prediction of a category of the document to which the entry refers. A value of a characteristic may be the prediction of the category of the document to which the entry refers.

The step CLASS_CONTENT 2024 serves to assign a score based on characteristics generated from the step FEAT_EXTRACT_CONTENT 2023.

According to an embodiment, the step CLASS_CONTENT 2024 may be implemented with the model built from statistical rules.

The model from step CLASS_CONTENT 2024 may for example be a machine-learning algorithm.

The machine-learning algorithm for the model from step CLASS_CONTENT 2024 may be a neural network. Alternatively, the machine-learning algorithm may be a random decision forest algorithm or a gradient boosting algorithm.

The machine-learning algorithm may for example be trained periodically. For example, a training phase can take place every month.

On output from the model from step CLASS_CONTENT 2024, a numeric score may be obtained from characteristics generated in the step FEAT_EXTRACT_CONTENT 2023. The numeric score may be included between a lower limit and an upper limit. Conventionally, the value 1 may be assigned to the lower limit. The value 100 may be assigned to the upper limit. The lower limit may be associated with an entry thought not to be pertinent. The upper limit may be associated with an entry thought to be very pertinent. Other conventions may be adopted for assigning scores.

Another score may be obtained on output from step CONTENT_SCO 202. The score obtained on output from step CONTENT_SCO 202 may be the score obtained on output from the model from step CLASS_CONTENT 2024 or a transformation of this score.

The step CONTENT_SCO 202 may be associated with a preset threshold. The preset threshold may be set as a function of the desired sensitivity of the model, meaning as a function of the desired capacity of the model to detect leaked documents and identify them as leaked documents. The preset threshold may be fixed by an operator or be fixed dynamically as a function of distribution of scores among all the inputs: for example it may be fixed by keeping only x % (x included between 0 and 100) of the entries or a preset number of entries. Of course, this threshold may also be determined as a function of a combination of the elements previously indicated such as the minimum between a percentage and a preset number of entries.

Each of the scores obtained in step CLASS_CONTENT 2024 may be compared to the preset threshold. For example, conventionally, if the score associated with an entry is greater than the preset threshold, then this entry may be deemed to be pertinent and to be analyzed in the remainder of the process for determining the degree of exposure of the data. In this case, the score on output from step CONTENT_SCO 202 may be the same as the score on output from step CLASS_CONTENT 2024 or a Boolean value, for example "1". If the score associated with an entry is less than the preset threshold, then this entry may be deemed to not be pertinent and to no longer be analyzed in the remainder of the method for determining the degree of exposure of the data. In this case, the score on output from the step FILEPATH_SCO 201 may be a Boolean value, for example "0".

In that way, from the set of the entries from the database obtained in step DOC_MATCH 200 or from the subset of the entries from the database obtained in step FILEPATH_SCO 201, the step CONTENT_SCO 202 may serve to determine a subset of entries from the database which could contain leaked data specific to a third party.

The step SERV_AGGR 203 may aim to group entries from the database on the basis of information about the servers hosting the documents with which the entries are associated.

The order of the steps FILEPATH_SCO 201, CONTENT_SCO 202 and SERV_AGGR 203 may be changed. The person skilled in the art will in that way understand that at least six embodiments can be derived from the four steps of step DATA_FILT 101. Further, it can be understood that some steps may be performed in whole or in part in parallel (i.e. one step may start while another step is not finalized).

As an example, two of these embodiments will be described below.

According to an embodiment, shown in FIG. 2, the steps from the step DATA_FILT 101, described above, may be performed in the following order:

In a first step, the filtering step DOC_MATCH 200 may allow a first filtering of the discovered documents. On output from this step, a label may be assigned to each of the entries from the database.

In a second step, the score assignment step FILEPATH_SCO 201 may allow calculating a first score for each of the entries from the database. Determining the first score may comprise the step FEAT_EXTRACT_FILEPATH 2011 of generating a value for a first characteristic for each of the entries. As previously disclosed, for one entry, the value of the first characteristic may be a function of the access path included in the entry. For example, the value of the first characteristic may be a function of occurrences of preset first keywords in the access path of the entry. Further, for each of the entries, determining the first score may include the step CLASS_FILEPATH 2012 of determining the first score from the value of the first characteristic. The first score may for example be determined by a machine-learning algorithm. On output from step FILEPATH_SCO 201, it is thus possible to get a score relating to the pertinence of the information from an entry from the database.

In a third step, the score assignment step CONTENT_SCO 202 may allow calculating a second score for each of the entries from the database. Determining the second score may comprise, for each entry, the step TRANSCRIPT_GEN 2021 of receiving a content associated with the entry and the step FEAT_EXTRACT_CONTENT 2023 of generation of a value for a second characteristic for each of the entries. For one entry, the value of the second characteristic may be a function of the content associated with the entry. For example, the value of the second characteristic may be a function of occurrences of preset second keywords in the content associated with the entry. Further, for each of the entries, determining the second score may include the step CLASS_CONTENT 2024 of determining the second score from the value of the second characteristic. The second score may for example be determined by a machine-learning algorithm. On output from step FILEPATH_SCO 201, it is thus possible to get a score relating to the pertinence of the information from an entry from the database.

In a fourth step, the server aggregation step SERV_AGGR 203 may serve to group entries from the database for which information about the server is the same. For example, information about the server may comprise the IP address of the server. Alternatively or in combination, the information about the server may comprise the URL of the server and/or the domain name of the server and/or the port and/or a protocol used by the server.

On output from the server aggregation step SERV_AGGR 203, for information about the server contained in the database, a table specific to information about the server may be generated containing all the scores for the entries from the database which share this same information about the server. From these scores, a server may or may not be analyzed in the remainder of the process for determining the degree of exposure of the data.

Figure 3:
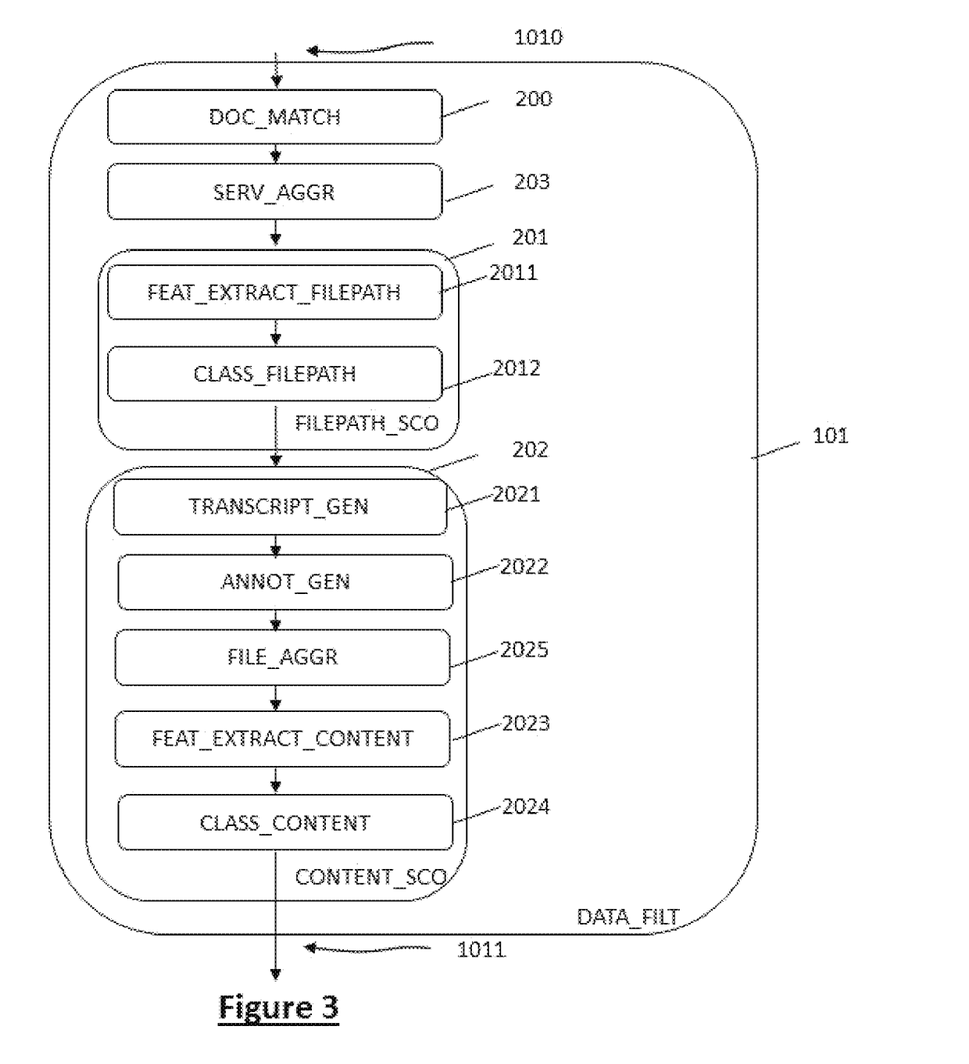
FIG. 3 represents a flowchart of various steps of the data filtering step DATA_FILT 101 according to another embodiment.

According to an embodiment, shown in FIG. 3, the steps from the step DATA_FILT 101 may be performed in the following order:

In a first step, the filtering step DOC_MATCH 200 may allow a first filtering of the discovered documents, as explained above. On output from this step, a label may be assigned to each of the entries from the set of entries/from the database, for example.

In a second step, the server aggregation step SERV_AGGR 203 may serve to generate subsets from the set of entries on the basis of information about the server. The server aggregation step SERV_AGGR 203 may serve to group entries from the database for which information about the server is the same. On output from the server aggregation step SERV_AGGR 203, for information about the server contained in the database, a table specific to information about the server may be generated containing all the entries from the database which share this same information about the server.

In the third step, the score assignment step FILEPATH_SCO 201 may serve to calculate a score for each of the subsets/each of the various tables specific to information about the server, as will be described below. Determining the first score may comprise the step FEAT_EXTRACT_FILEPATH 2011 of generating a value for a first characteristic for each subset. For a subset, the value of the first characteristic may be a function of the access paths included in each entry of the subset. For example, the value of the first characteristic may be a function of a number of distinct access paths in the entries from the subset or occurrences of preset first keywords in access paths for each entry from the subset as described above. Further, for each of the subsets, determining the first score may include the step CLASS_FILEPATH 2012 of determining the first score from the value of the first characteristic. The first score may for example be determined by a machine-learning algorithm. In other words, at the outcome of the step FILEPATH_SCO 201, it is possible to get a score relating to the pertinence of the information accessible online from a given server.

In a fourth step, the score assignment step CONTENT_SCO 202 may serve to calculate a second score for each of the various tables specific to information about the server, as will be described below. Determining the second score may comprise, for each subset, the step TRANSCRIPT_GEN 2021 of receiving a content associated with each entry of the subset and the step FEAT_EXTRACT_CONTENT 2023 of generation of a value for a second characteristic for each subset. Alternatively, the step TRANSCRIPT_GEN 2021 may be dependent on only a portion of entries, meaning only some entries, meaning that some entries might not have their content downloaded in step TRANSCRIPT_GEN 2021. For example, the entries for which the content is downloaded may be determined on the basis of occurrences of preset keywords in the access path of the entries of the subset. For a subset, the value of the second characteristic may be a function of the access paths included in each entry of the subset. For example, the value of the second characteristic may be a function of occurrences of preset second keywords in downloaded content associated with each entry of the subset as disclosed below. Further, for each of the subsets, determining the second score may include the step CLASS_CONTENT 2024 of determining the second score from the value of the second characteristic. The second score may for example be determined by a machine-learning algorithm.

According to this embodiment, the entries from the database considered for the steps FILEPATH_SCO 201 and CONTENT_SCO 202 may be, for an analyzed server, the entries from the database specific to that server.

Thus, the characteristics of the step FEAT_EXTRACT_FILEPATH 2011 may be generated from the entries from a table specific to a given server. The table specific to a given server may have been obtained in the step SERV_AGGR 203 and may comprise entries from the database sharing a single item of information about the server. In other words, according to this embodiment, the entries from the database considered for the generation of characteristics may be specific to the given server. This means that each server may have different characteristics.

The step CLASS_FILEPATH 2012 may thus serve to assign a score to each of the servers based on characteristics generated from the step FEAT_EXTRACT_FILEPATH 2011.

On output from the model of step 2012, a numeric score may thus be obtained for each of the analyzed servers. This score may reflect the pertinence of the documents accessible in a given server in light of a possible data leak specific to a third party.

The given server may then be analyzed or not during the step CONTENT_SCO 202.

In that way, from the set of tables specific to the various servers obtained in step SERV_AGGR 203, the step FILEPATH_SCO 201 may serve to determine a subset of tables specific to servers which could contain leaked data.

The step of assigning scores CONTENT_SCO 202 may take as input the subset of tables specific to servers which could contain leaked data. Alternatively, the step of assigning scores CONTENT_SCO 202 may also take as input the set of the tables specific to the various servers obtained in step SERV_AGGR 203.

The step TRANSCRIPT_GEN 2021 may take as entries the tables specific to the IP addresses/servers obtained in step SERV_AGGR 203 or step CONTENT_SCO 202.

The step FILE_AGGR 2025 may aim to jointly aggregate/analyze documents of annotations specific to the transcribed documents generated from a table specific to the given server.

The step FILE_AGGR 2025 is optional.

On output from the step of aggregation by server FILE_AGGR 2025, for a given server analyzed during the step CONTENT_SCO 202, a table of annotations specific to a server may be generated. The table of annotations specific to a server may have a plurality of entries each comprising in particular a document of annotations generated in step ANNOT_GEN 2022, specific to a document transcribed from a document accessible on the given server.

The table of annotations specific to a given server may further comprise the number of entries included in the table specific to the given server. A ratio of annotations may be calculated from both, the number of entries from the table specific to the given server for which an annotation document was generated in step ANNOT_GEN 2022 and also, from the number of entries from the table specific to the given server. This ratio of annotations may be added to the table of annotations specific to the given server.

The step FEAT_EXTRACT_CONTENT 2023 may serve to generate characteristics from the table of annotations specific to the server obtained in step FILE_AGGR 2025. Characteristics may be generated in addition to those presented above and specific to the server.

A characteristic may be the ratio of annotations. This number may have been calculated in the step FILE_AGGR 2025.

A characteristic may be the number of entries from the table specific to the server for which an annotation document was generated. This number may have been calculated in the step FILE_AGGR 2025.

Some characteristics may be generated from categories predicted in step ANNOT_GEN 2022. For example, the categories from step ANNOT_GEN 2022 may be regrouped into themes. These themes may for example be among the following themes: technical drawings, financial documents, information and communication technology-related documents.

For example, the theme of technical drawings may combine in particular the categories of technical drawings and of illustrations.

For each of the themes, a characteristic may be generated. For a theme, a characteristic may be a number of matches between the categories of this theme and the category predicted in the table of annotations specific to the server. This characteristic may be weighted by the number of predicted categories present in the table of annotations specific to the server.

Some characteristics may be generated from the sensitive nature predictions obtained in step ANNOT_GEN 2022.

For example, based on sensitive nature prediction probabilities present in the table of annotations specific to the server, statistical measures may be calculated. These statistical measures may include an average, standard deviation, variance, and median. Some characteristics may be selected from these statistical measures.

Intervals may be defined for the sensitive nature predictions. For example, four intervals may be defined. These intervals may correspond to a low, medium, high and very high sensitivity level. These intervals may be [0, 0.37[, [0.37, 0.5[, [0.5, 0.63[ and [0.63,1.1[. Characteristics may be generated from the counts of the elements from the predictions in the intervals. These numbers may be weighted by the number of predictions present in the table of annotations specific to the server.

As an illustrative example only, for a specific table of annotations containing the set of sensitive nature predictions "0.99, 0.5, 0.3, 0.78," the following characteristics could be obtained: 0.2 for the interval [0, 0.37[, 0.2 for the interval [0.5, 0.63[, 0.4 for the interval [0.63, 1.1[.

Characteristics may be generated from numbers of keywords that are distinct and specific to the third parties for which a match was obtained in an annotation document. For example, based on numbers obtained for each of the annotation documents present in the table of annotations specific to the server, statistical measures may be calculated. These statistical measures may include an average, standard deviation, variance, and median. Characteristics may be selected from these statistical measures.

Intervals may be defined from numbers of keywords that are distinct and specific to the third parties for which a match was obtained in an annotation document. These intervals may correspond to a null number, a unit number and to any other number. Characteristics may be generated from the counts of the elements in the intervals of the numbers of keywords that are distinct and specific to the third parties for which a match was obtained in an annotation document. These numbers may be weighted by the number of annotation documents present in the table of annotations specific to the server.

Characteristics may be generated from numbers of keywords that are distinct and not specific to the third parties for which a match was obtained in an annotation document. For example, based on numbers obtained for each of the annotation documents present in the table of annotations specific to the server, statistical measures may be calculated. These statistical measures may include an average, standard deviation, variance, and median. Characteristics may be selected from these statistical measures.

Intervals may be defined from numbers of keywords that are distinct and not specific to the third parties for which a match was obtained in an annotation document.

These intervals may correspond to a zero number, a number included between 1 and 7, and any other number.

Characteristics may be generated from numbers belonging to the intervals of numbers of keywords that are distinct and not specific to the third parties for which a match was obtained in an annotation document. These numbers may be weighted by the number of annotation documents present in the table of annotations specific to the server.

Characteristics may be generated from matches between keywords not specific to the third party and the content of the transcribed document present in the table of annotations specific to the server.

The matches may be grouped according to category. For example, the categories may comprise themes in particular from architecture, financial affairs, information and communication technology, and legal affairs.

The step CLASS_FILEPATH 2024 may serve to assign a score to each of the servers based on characteristics generated from the step FEAT_EXTRACT_FILEPATH 2023.

On output from the model from step CLASS_CONTENT 2024, a numeric score may thus be obtained for each of the analyzed servers. This score may reflect the pertinence the documents accessible in a given server in light of a possible data leak specific to a third party. This score may be compared to a preset threshold. As a function of the result of the comparison, the given server may be analyzed or not in the remainder of the process for determination of the degree of exposure of the data, as previously explained.

Based on scores obtained on output from the model of step CLASS_CONTENT 2024 the intervals for the characteristics from the step FEAT_EXTRACT_CONTENT 2023 may be optimized. For example, these intervals may be chosen in order to optimize statistical measures between one statistical distribution of data from the analyzed servers and a statistical distribution of data from servers not analyzed in the remainder of the process of determination of the degree of exposure of the data. In other words, the characterization intervals from the step FEAT_EXTRACT_CONTENT 2023 may be retroactively adjusted from outputs of the model from step CLASS_CONTENT 2024. For one characteristic, if the data specific to the analyzed servers are statistically more distributed in an interval different from an interval in which the data specific to the servers not analyzed are distributed, then the intervals of the step FEAT_EXTRACT_CONTENT 2023 specific to this characteristic may be readjusted according to the intervals found based on the outputs of the model from step CLASS_CONTENT 2024.

For a characteristic, the intervals from the step FEAT_EXTRACT_CONTENT 2023 may optimize a correlation between a p-value sought and a p-value obtained by a statistical test. This statistical test may test the hypothesis according to which the distributions of data specific to the analyzed servers and to the unanalyzed servers are equal. This statistical test may be a Wilcoxon-Mann-Whitney text (https://fr.wikipedia.org/wiki/Test_de_Wilcoxon-Mann-Whitney).

In that way, based on the set of tables specific to the various servers obtained in step SERV_AGGR 203 or from the subset of tables specific to the various servers which could contain leaked information specific to a third party obtained in step FILEPATH_SCO 201, the step CONTENT_SCO 202 may serve to determine a subset of tables specific to servers which could contain leaked data specific to a third party.

The determination 1011 of the degree of exposure of the data present on the server associated with the subset may be done on the basis of at least one score from the score obtained on output from the step FILEPATH_SCO 201 and the score obtained on output for the step CONTENT_SCO 202.

For example, when only one of the steps FILEPATH_SCO 201 and CONTENT_SCO 202 is implemented, the degree of exposure may correspond to the score obtained on output from the implemented step. The degree of exposure may also be a Boolean variable taking for example the value "0" when the entry/the server is deemed as not pertinent following the comparison of the score with the preset threshold from the step as previously explained.

When the two steps FILEPATH_SCO 201 and CONTENT_SCO 202 are implemented and if the two scores are determined, the degree of exposure may be an average, weighted or unweighted, of the scores obtained on output from the steps FILEPATH_SCO 201 and CONTENT_SCO 202.

Nevertheless, as discussed previously, if one of the scores obtained on output from one of the steps FILEPATH_SCO 201 and CONTENT_SCO 202 is less than a preset threshold, an entry and/or a server might not be analyzed further in the remainder of the process of determination of the degree of exposure. In this case, the degree of exposure may correspond to a binary information "0" which may mean that the exposed data on the server are thought unlikely to represent a computer threat.

Figure 4:
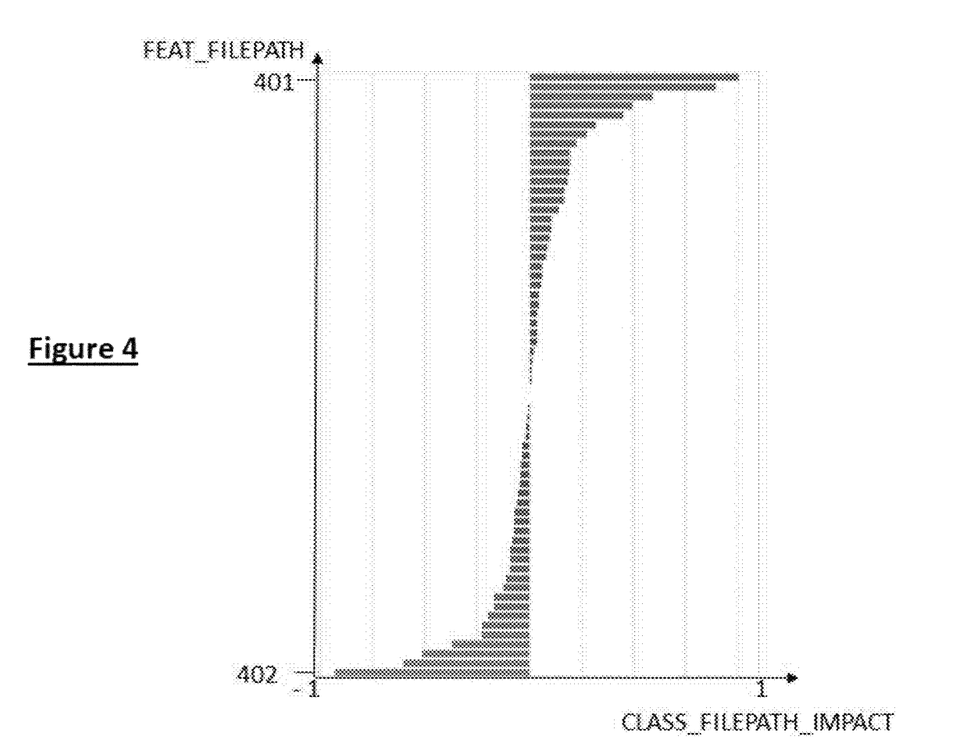
FIG. 4 represents an impact of a perturbation of a value of a characteristic of the model CLASS_FILEPATH on a score obtained in output from this model.

FIG. 4 represents the impact of a perturbation of a value of a characteristic of the CLASS_FILEPATH model on the score obtained on output from this model.

The perturbation of the value of a characteristic may for example consist of slightly changing the value of the characteristic. The impact of the perturbation may be a difference between the scores obtained on output of the CLASS_FILEPATH model before and after the perturbation, while keeping the other characteristics unchanged. In FIG. 4, the CLASS_FILEPATH_IMPACT impacts of the perturbations are shown on the abscissa (horizontal axis) and the various FEAT_FILEPATH characteristics of the CLASS_FILEPATH model are shown on the ordinate (vertical axis).

The characteristic 401 may be the characteristic for which the impact of the perturbation is maximally positive. This characteristic may be based on the number of distinct access paths included in the entries from the database. A perturbation of this characteristic may significantly change the score obtained on output from the CLASS_FILEPATH model. For example, the score may be significantly increased following a small increase of the value of the characteristic 401.

The characteristic 402 may be the characteristic for which the impact of the perturbation is maximally negative. This characteristic may be based on occurrences of keywords in the access paths included in the entries from the database. This may mean that a perturbation of this characteristic may significantly change the score obtained on output from the CLASS_FILEPATH model. For example, the score may be significantly decreased following a small increase of the value of the characteristic 402.

Thus, the characteristics 401 and 402 may have a major importance in the process of determining the degree of exposure of the data. Advantageously, a significant complexity may not be required for generating these characteristics.

A low electricity consumption and economic cost may then be required for determining scores by the CLASS_FILEPATH model starting from characteristics including the characteristics 401 and 402.

Figure 5:
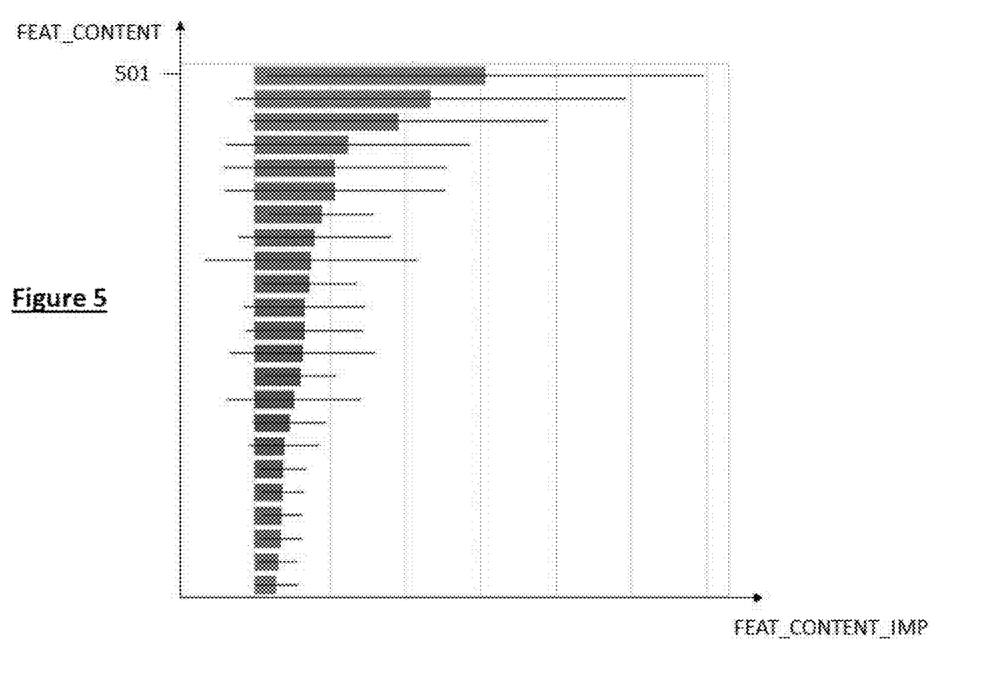
FIG. 5 represents an importance of a characteristic of the model CLASS_CONTENT on a score obtained on output from this model.

FIG. 5 represents the importance of a characteristic of the CLASS_CONTENT model on a score obtained on output from this model. The importance of the FEAT_CONTENT_IMP characteristics are shown on the abscissa (horizontal axis) and the various FEAT_CONTENT characteristics of the CLASS_CONTENT model are shown on the ordinate (vertical axis). A characteristic with greater importance may have more influence on the score obtained on output from the model than a characteristic with lesser importance.

Characteristic 501 is the characteristic with the greatest importance. This characteristic may be based on occurrences of keywords in the contents of annotation documents.

Advantageously, a significant complexity may not be required for generating this characteristic. Thus, a low electricity consumption and economic cost may be required for determining scores by the CLASS_CONTENT model starting from characteristics including the characteristics 501.

Figure 6:
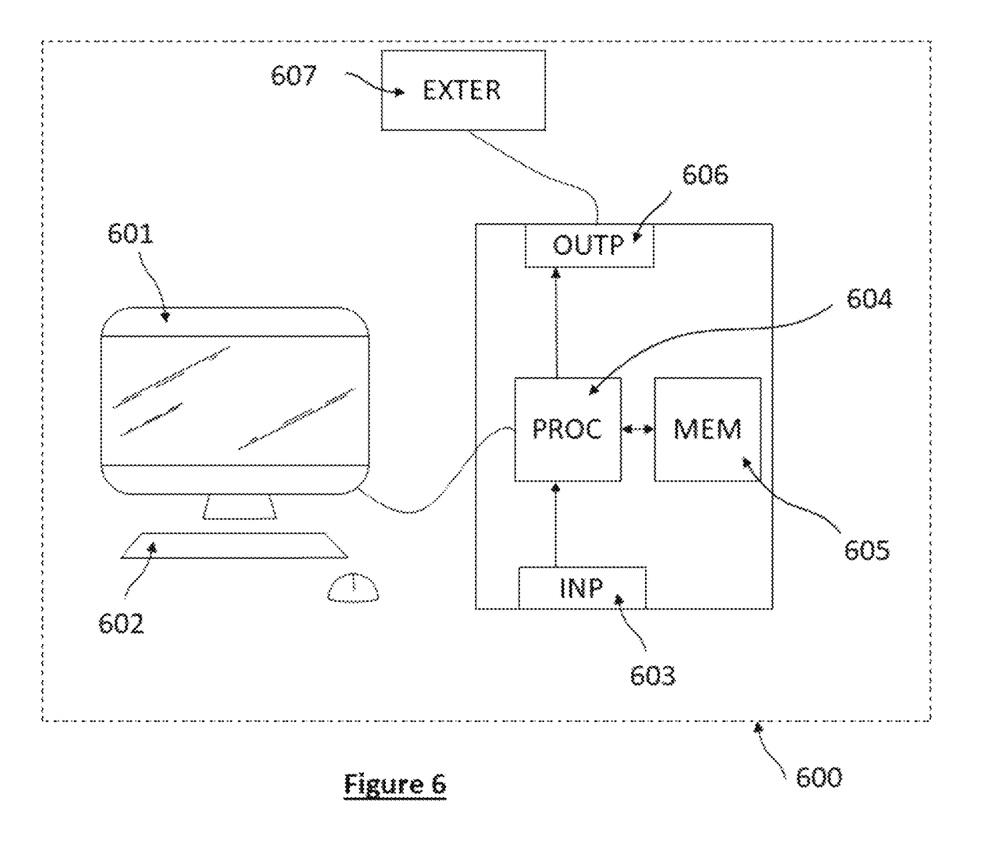
FIG. 6 represents an example of a device for determining a degree of data exposure.

FIG. 6 represents an example of a device for determining a degree of data exposure.

In this embodiment, the device comprises a computer 600 comprising memory 605 for storing instructions with which to implement the process, received measurement data and temporary data for executing the various steps of the process such as previously described.

The computer further comprises a circuit 604. This circuit may for example be:
- a processor able to interpret instructions in computer program form; or
- an electronic card for which the steps of the process from the invention are described in silicon; or even
- a programmable electronic chip like an FPGA (Field-Programmable Gate Array).

This computer comprises an input interface 603 for receiving data in particular the entries associated with the documents. Finally, in order to provide easy interaction with the user, the computer may comprise a screen 601 and keyboard 602. Of course, the keyboard is optional.

Of course, the present invention is not limited to the embodiments described above as examples; it extends to other variants.

Other implementations are possible.

The invention claimed is:

1. A process for determining a degree of exposure of data, wherein the process comprises:
   receiving a set of entries associated with documents, where each of the entries comprises a respective access path for the associated document and information about the server hosting said associated document;
   generating subsets from the set of entries on the basis of information about the server;
   for at least one subset in said generated subsets:
      determining at least one score among a first and a second scores;
      wherein the determination of the first score comprises:
      generating a value for a first characteristic of said at least one subset, where said value of the first characteristic is a function of the access paths included in each entry from said subset;
      determining, with a machine-learning algorithm, the first score based on said value of the first characteristic;
      and wherein determining the second score comprises:
      receiving content associated with each entry from said subset;
      generating a value of a second characteristic for said at least one subset, where said value of the second characteristic is a function of said associated content;
      determining, with a machine-learning algorithm, the second score based on said value of the second characteristic;
   determining, on the basis of the at least one score, the degree of exposure of the data present on said server associated with said subset.

2. The process according to claim 1, wherein the value of the first characteristic is a function of a number of distinct access paths in the entries from the subset or occurrences of preset first keywords in access paths for each entry from said subset.

3. The process according to claim 1, wherein the value of the second characteristic is a function of occurrences of second preset keywords in the contents associated with each entry from said subset.

4. The process according to claim 1, wherein receiving the contents is dependent on a portion of entries, where the portion of entries is determined on the basis of occurrences of preset keywords in the access paths of the entries from the subset.

5. A process for determining a degree of exposure of data, wherein the process comprises:
   receiving a set of entries associated with documents, where each of the entries comprises a respective access path for the associated document and information about the server hosting said associated documents;
   for at least one entry in said received set of entries:
      determining at least one score among a first and a second scores, wherein determining the first score comprises:
      generating a value for a first characteristic for said at least one entry, where said value of the first characteristic is a function of the access path included in said at least one entry;
      determining, with a machine-learning algorithm, the first score based on said value of the first characteristic;
      and wherein determining the second score comprises:
      receiving the content associated with said at least one entry;
      generating a value of a second characteristic for said at least one entry, where said value of the second characteristic is a function of said at least one associated content;
      determining, with a machine-learning algorithm, the second score based on said value of the second characteristic;
   generating subsets from the set of entries on the basis of information about the server;
   for at least one subset in said generated subsets:
      determining, on the basis of the at least one score determined for each entry from said subset, the degree of exposure of the data present on said server associated with said subset.

6. The process according to claim 5, wherein the value of the first characteristic is a function of occurrences of preset first keywords in the access path of said at least one entry.

7. The process according to claim 5, wherein the value of the second characteristic is a function of occurrences of second preset keywords in the contents associated with said at least one entry.

8. The process according to claim 1, wherein the first and second scores are determined and wherein the degree of exposure of the data present on said server associated with said subset is determined on the basis of the first and the second scores.

9. The process according to claim 5, wherein the first and second scores are determined and wherein the degree of exposure of the data present on said server associated with said subset is determined on the basis of the first and the second scores.

10. The process according to claim 1, wherein the information about the server comprises at least one item of information among an IP address of the server, a URL of the server, a domain name of the server, a port used by the server and a protocol used by the server.

11. The process according to claim 5, wherein the information about the server comprises at least one item of information among an IP address of the server, a URL of the server, a domain name of the server, a port used by the server and a protocol used by the server.

12. A computer device for determining a degree of exposure of data, wherein the device comprises:
an interface for receiving a set of entries associated with documents, where each of the entries comprises a respective access path for the associated document and information about the server hosting said associated document;
a circuit for generating subsets from the set of entries on the basis of information about the server;
for at least one subset in said generated subsets:
at least one circuit among a first and a second circuit;
a first circuit for generating a value for a first characteristic of said at least one subset, where said value of the first characteristic is a function of the access paths included in each entry from said subset;
the first circuit for determining, with a machine-learning algorithm, a first score based on said value of the first characteristic;
an interface for receiving content associated with each entry from said subset;
a second circuit for generating a second characteristic for said at least one subset, said second characteristic being a function of occurrences of preset keywords in said associated content;
the second circuit for determining, with a machine-learning algorithm, a second score based on said second characteristic;
a circuit for determining, on the basis of the at least one score, determined by the at least one circuit, the degree of exposure of the data present on said server associated with said subset.

13. A computer device for determining a degree of exposure of data, wherein the device comprises:
an interface for receiving a set of entries associated with documents, where each of the entries comprises a respective access path for the associated document and information about the server hosting said associated document;
for at least one entry in said received set of entries:
at least one circuit among a first and a second circuit for determining at least one score among a first and a second scores;
wherein:
a first circuit for generating a value for a first characteristic for said at least one entry, where said value of the first characteristic is a function of the access path included in said at least one entry;
the first circuit for determining, with a machine-learning algorithm, the first score based on said value of the first characteristic;
an interface for receiving the content associated with said at least one entry;
a second circuit for generating a value of a second characteristic for said at least one entry, where said value of the second characteristic is a function of said at least one associated content;
the second circuit for determining, with a machine-learning algorithm, the second score based on said value of the second characteristic;
a circuit for generating subsets from the set of entries on the basis of information about the server;
for at least one subset in said generated subsets:
a circuit for determining, on the basis of the at least one score, determined for each entry of said subset by the at least one circuit, the degree of exposure of the data present on said server associated with said subset.

14. A computer program comprising instructions for implementation of the process according to claim 1 when this program is executed by a processor circuit.

15. A computer-readable non-transitory storage medium comprising a nonvolatile memory on which is recorded a program for implementation of the process according to claim 1 when this program is executed by a processor.

* * * * *